United States Patent [19]

Keyes

[11] 4,364,666
[45] Dec. 21, 1982

[54] MACHINE FOR MIXING AND COOLING BATCHES OF DRY POWDER INGREDIENTS AND WATER

[75] Inventor: Richard M. Keyes, Lake Sommerset, Ill.

[73] Assignee: Beatrice Foods Co., Chicago, Ill.

[21] Appl. No.: 193,758

[22] Filed: Oct. 3, 1980

[51] Int. Cl.³ .......................... B01F 7/08; B01F 15/00
[52] U.S. Cl. ..................................... 366/142; 366/143; 366/149; 366/181; 366/182; 220/314; 220/377; 62/342; 366/192; 366/194; 116/227
[58] Field of Search ............... 366/131, 132, 134, 143, 366/142, 144, 149, 154, 184, 177; 49/394; 73/334, 323; D15/82; 62/340, 125, 342, 343; 220/314, 82, 377; 99/285; 222/157; 292/259, 260; 116/227, 229

[56] References Cited

U.S. PATENT DOCUMENTS

| | | |
|---|---|---|
| 534,720 | 2/1895 | Mitchell ............................... 292/259 |
| 1,185,121 | 5/1916 | Miller ................................. 366/149 X |
| 1,748,598 | 2/1930 | Dermody ............................ 292/259 |
| 1,930,941 | 10/1933 | Modlin ................................. 62/125 |
| 2,283,487 | 5/1942 | Boileau . | |
| 2,559,032 | 7/1951 | Tacchella .............................. 62/342 |
| 3,729,177 | 4/1973 | Keyes et al. . | |
| 3,818,716 | 6/1974 | Carpigiani . | |
| 3,858,498 | 1/1975 | Swenson ........................... 62/342 X |
| 4,169,359 | 10/1979 | Weerstra ......................... 366/149 X |

FOREIGN PATENT DOCUMENTS 624401  7/1927  France .................................. 292/259

*Primary Examiner*—Philip R. Coe
*Assistant Examiner*—Joseph M. Pitko
*Attorney, Agent, or Firm*—Vernon J. Pillote

[57] ABSTRACT

A machine for mixing and cooling batches of dry powder ingredients and water comprising, a horizontal mixing cylinder open at one end and having a rotary mixer in the cylinder. Refrigerating mechanism is provided for cooling the walls of the cylinder and for maintaining the mixing cylinder temperature in a range below 45° F. and above 32° F., a door for closing said one end of the cylinder. The mixing cylinder has a dry powder ingredient inlet passage extending through the cylindrical side wall at the top of the cylinder at a location spaced from said one end. The door has a mix dispensing outlet communicating with the lower portion of the cylinder and a dispensing valve for controlling flow through the dispensing outlet and the door has a water inlet communicating with the upper portion of the cylinder and a funnel at the outside of the door extending upwardly to a level above the cylinder. The door is formed of a transparent plastic material and has liquid level graduations thereon correlated with the volume at different levels in the cylinder, and water supply means including a selectively operable water control valve is provided on the machine above the door with a water delivery outlet at a location to deliver water to said funnel on the door when the water control valve is opened.

2 Claims, 3 Drawing Figures

U.S. Patent
Dec. 21, 1982
4,364,666
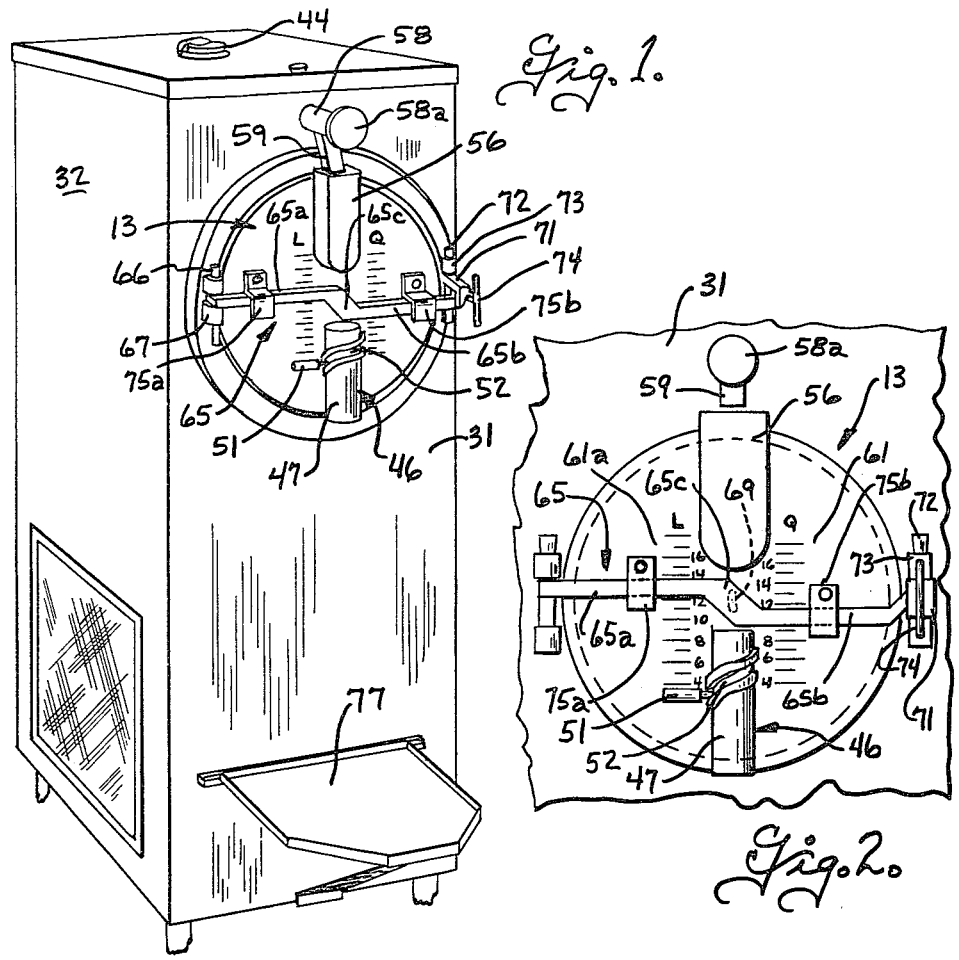
Fig. 1.
Fig. 2.
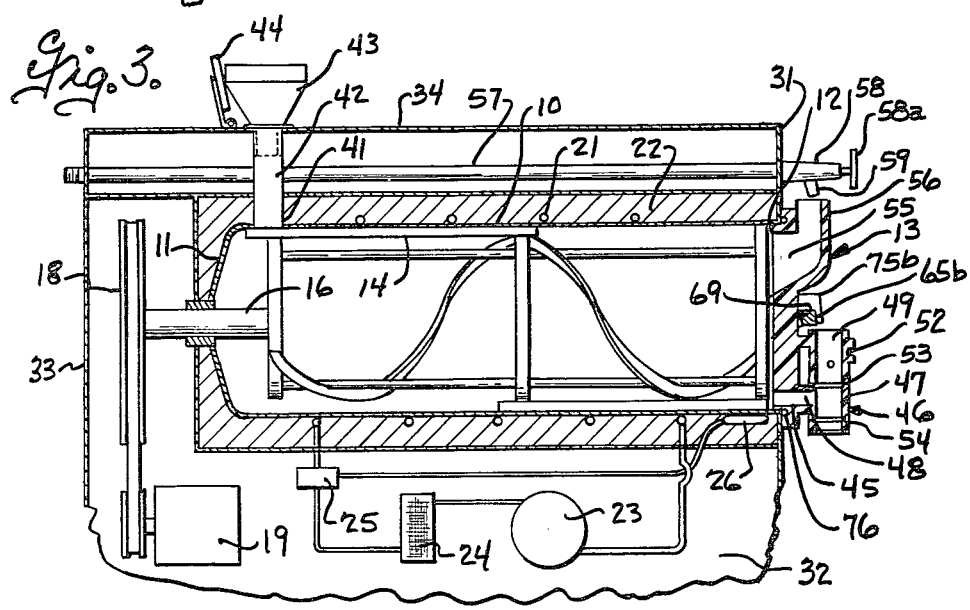
Fig. 3.

MACHINE FOR MIXING AND COOLING BATCHES OF DRY POWDER INGREDIENTS AND WATER

BACKGROUND OF THE INVENTION

It has been proposed, for example as shown in U.S. Pat. Nos. 3,818,716 and 3,858,498, to provide a machine for freezing and dispensing soft ice cream in which dry powdered ingredients are stored in a reservoir on the ice cream machine and wherein small quantities of dry powdered ingredients and water are metered and fed through a mixing chamber to the freezing cylinder of the ice cream machine, as product is withdrawn from the freezing cylinder. It is a more common practice, however, in ice cream and milk shake freezing and dispensing machines, to store a pre-mixed batch of liquid mix in a reservoir on the machine and to feed liquid mix from the reservoir to the freezing cylinder, as product is withdrawn from the cylinder. Some ice cream machines, for example as shown in U.S. Pat. No. 2,283,487, feed the liquid mix to the freezing cylinder through an opening in the top of the door at the outlet end of the freezing cylinder. Other soft ice cream machines, for example as shown in U.S. Pat. No. 3,729,177 feed the liquid mix to freezing cylinder at a location remote from the outlet end of the freezing cylinder so that the incoming liquid product does not adversely affect the condition of the ice cream adjacent the outlet end of the freezing cylinder.

SUMMARY OF THE INVENTION

It is a general object of the present invention to provide a machine for mixing and cooling batches of dry powder ingredients and water for use in liquid feed type soft ice cream and milk shake machines as well as in batch type hard ice cream machines, and which is simple to operate and obtain the desired powdered mix to water ratio.

Accordingly, the present invention provides a machine for mixing and cooling batches of dry powder ingredients and water which includes a horizontal mixing cylinder open at one end, a rotary mixer in the cylinder, drive means extending through the other end of the cylinder for driving the rotary mixer, refrigerating means for cooling the walls of the cylinder to maintain a preselected temperature therein above the freezing temperature of the liquid, a door for closing the end of the cylinder, means for securing the door in a cylinder closing position, the cylinder having a dry powder ingredient inlet passage at a location spaced from said one end of the cylinder, the door having a mix dispensing outlet communicating with the lower portion of the cylinder and a dispensing valve for controlling the flow through dispensing outlet, the door having a water inlet communicating with the upper portion of the cylinder and a funnel at the outside of the door extending upwardly to a level above the cylinder, the door being formed of a transparent plastic material and having liquid level graduations thereon correlated with the volume at different levels in the cylinder, and water supply means including a selectively operable water control valve mounted on the machine above the door and having a water delivery outlet at a location to deliver water to the funnel on the door when the water control valve is opened.

These, together with other objects, features and advantages of this invention will be more readily understood by reference to the following detailed description, when taken in connection with the accompanying drawings wherein:

FIG. 1 is a perspective view of a machine for mixing and cooling batches of dry powder ingredients and water;

FIG. 2 is a fragmentary front elevational view of the door in FIG. 1; and

FIG. 3 is a fragmentary vertical sectional view, through the mixing and cooling machine, with some parts shown diagrammatically.

The machine for mixing and cooling batches of dry powder ingredients and water includes a horizontal mixing cylinder 10 which is closed at one end 11 and open at its other end 12, and which has a door 13 removably attached to the open end of the cylinder to close the same. A rotary mixer 14 is disposed in the mixing cylinder 10 and is connected to a drive shaft 16 that extends through the closed end 11 of the cylinder. As diagrammatically illustrated in FIG. 3, a mixer drive shaft 16 is connected through a speed reducing drive 18 to an electric drive motor 19. The mixing cylinder is refrigerated to cool the contents of the cylinder and, as shown, has a condensing coil 21 of a refrigerating mechanism disposed therearound and enclosed in a heat insulating jacket 22. As is conventional, the condenser coil 21 is connected to a conventional refrigerating mechanism diagrammatically illustrated in FIG. 3 and including a compressor 23, condenser 24 and refrigerant expansion control 25. The refrigerant expansion control 25 is advantageously of the thermostatic type controlled by a temperature sensing bulb 26 which is responsive to the temperature of the mixing cylinder, to control the flow of refrigerant to the expansion coil 21 and maintain the temperature in the cylinder in a range which is sufficiently low to inhibit growth of bacteria in the mix and which is yet above freezing temperature of the mix. The temperature sensor may, for example, be arranged to maintain the mixing cylinder temperature in a range below 45° F. and above 32° F. and preferably about 40° F.

The mixing and cooling machine is enclosed in a housing including a front wall 31, side walls 32, rear wall 33 and top wall 34 and a suitable supporting and rigidifying framework (not shown) is disposed within the housing to support the various parts of the machine. In the embodiment illustrated, the machine is a floor model, it being apparent that the machine could be a table top model, if desired.

The machine is arranged for mixing and cooling batches of dry powder ingredients and water, and provision is made for introducing a preselected quantity of dry powder ingredients into the mixing cylinder at a location spaced from the door, and for introducing the water into the mixing cylinder in a manner to enable the operator to visually observe and measure the quantity of water being introduced, to obtain the desired water-mix proportion. As shown in FIG. 3, a powder mix fill opening 41 is provided in the mixing cylinder 10 at a location remote from the door 13 and preferably adjacent the closed end 11 of the cylinder. A filler tube 42 extends from the opening 41 through the insulating enclosure 22 and out through the top wall 34 of the housing. A funnel 43 is provided to facilitate introduction through the filler tube, and a filler tube cover 44 is provided for closing the filler tube, to prevent entrance of foreign material when the machine is not in use. As shown, cover 44 is conveniently hingedly connected to the machine.

For reasons pointed out hereinafter, the door 13 is formed of a transparent plastic material and has a mix dispensing outlet 45 extending therethrough adjacent the lower portion of the mixing cylinder, and a dispensing valve 46 for controlling flow through the dispensing outlet. In the embodiment illustrated, the dispensing valve 46 includes a vertical cylinder 47 open at its upper and lower ends and having a lateral passage 48 extending from the valve cylinder 47 at a location above its lower end and communicating with the mix outlet 45 in the door. A valve piston 49 is slidably disposed in the valve cylinder 47 and is adapted to be raised and lowered as by a manually operable actuator 51 that extends through a spiral cam slot 52 in the valve cylinder. The valve piston has O-rings 53 and 54 disposed respectively above and below the lateral passage 48 when the valve member is in its lowered position, and the valve member is adapted to be raised to a position in which the lower end of the valve member at least partially and preferably entirely uncovers the lateral passage 48. While a piston type valve is herein shown, it is to be understood that any other suitable dispensing valve and valve actuator can be provided if desired.

The door 13 has a water inlet opening 55 extending therethrough and communicating with the upper portion of the cylinder, and a funnel 56 at its outer side communicating with the water inlet opening 55 and extending upwardly to a level above the top of the cylinder. A water supply pipe 57 is provided in the housing and is adapted for connection at its rear end to a source of water under pressure. A water control valve 58 is connected to pipe 57 and mounted on the front of the machine above the door 13. The water supply valve 58 has a water delivery outlet spout 59 at a location to deliver water to the funnel 56 when the water control valve is open. Valve 58 can be of any suitable construction but is preferably of the type in which the valve member is spring biased to its closed position, and which has an operating button 58a which is adapted to be depressed to open the valve. The door is formed of a transparent plastic material to enable viewing of the liquid level in the mixing cylinder, and liquid level graduations are provided on the door and correlated with the volume at different levels in the mixing cylinder to indicate the volume of liquid in the cylinder when it is filled to the level of the different graduations. A set of liquid level graduations 61 is disposed in a vertical column offset from the center of the door so as to extend alongside the valve 46 and funnel 56. A second set of liquid level graduations 61a can be provided on the door at the other side of the center line and, conveniently, one set of the graduations such as 61 can be selected to indicate volume in quarts or pints and the second set to indicate volumes in liters.

The door 13 is secured in a position closing the open end of the cylinder by a retainer bar 65. The retainer bar is conveniently hingedly secured at one end by a hinge pin 66 extending through lugs 67 at one side of the front end of the mixing cylinder. The retainer bar is arranged to extend across the outer side of the door and to engage a central boss 69 (FIG. 3) on the door. The other end of the retainer bar 65 is secured by a clamp 71 that is swingably mounted by a pin 72 on lugs 73 at the other side of the door, and the clamp has a clamp screw 74 thereon engageable with the end of the retainer bar to adjust the clamping pressure applied to the bar. As best shown in FIGS. 1 and 2, the retainer bar has first and second generally horizontal bar end portions 65a and 65b that are interconnected adjacent the center of the door by a connecting portion 65c, and the end portions 65a and 65b are vertically offset from each other a distance greater than the vertical depth of the bar end portions so that, when the liquid level is obscured at one side of the door by one bar end portion, the liquid level can still be viewed at the other side of the door. The door is advantageously detachably supported on the retainer bar and, as shown, downwardly opening hook members 75a and 75b are secured on the outer side of the door at locations to engage the bar end portions 65a and 65b respectively. The hooks releasably support the door on the retainer bar so that the door can swing into and out of closed position with the retainer bar, but can be easily removed by lifting therefrom. A gasket 76 (FIG. 3) is provided for sealing the interface between the door and the cylinder. A support platform 77 is mounted on the front 31 of the machine to support a suitable mix receptacle (not shown) below the dispensing valve 46.

From the foregoing it is thought that the construction, operation and use of the machine will be readily understood. A quantity of dry powder ingredients sufficient to make a batch of liquid mix is introduced into the mixing cylinder by way of funnel 43, filler tube 42 and dry ingredient inlet 41. The liquid inlet opening 55 in the front of the door is open and this provides a vent for the mix cylinder so that the dry powdered ingredients to not blow back through the dry ingredient inlet 41, as the powder is introduced into the mixing cylinder. The amount of water to be added to the batch quantity of dry powder mix to obtain a liquid mix of the desired consistency is predetermined in accordance with a formula provided with the dry mix ingredients, and will vary dependent on whether the liquid mix is to be used with a soft serve machine, a milk shake machine or a batch type hard ice cream freezer. The valve 58 is then opened to feed water through the funnel 56 and water inlet opening 55 in the door into the mixing cylinder until the liquid level in the mix cylinder reaches a volume as indicated by the graduations 61 or 61a on the door, correlative with the proper volume of water for the batch. Since the valve is at the front of the machine, the liquid level in the mixing cylinder can be readily observed while operating the valve. The machine is then turned on to start the refrigerant compressor 23 and mixer drive motor 19 to thereby mix and cool the batch of dry powder ingredients and water. The cooling of the batch not only inhibits the growth of bacteria in the batch, but also reduces foaming during mixing. After the batch is mixed and cooled, it can then be drawn off through the dispensing valve 46 and introduced into an ice cream freezing machine such as a soft-serve machine, a milk shake machine, or batch type hard ice cream freezer. Since the batch of liquid mix is cooled, it also reduces refrigeration load on the ice cream freezing machine.

The embodiments of the invention in which an exclusive property or privilege is claimed are defined as follows:

1. A machine for mixing and cooling batches of dry powder ingredients and water comprising, a horizontal mixing cylinder open at one end, a rotary mixer in the cylinder, drive means extending through the other end of the cylinder for driving the rotary mixer, refrigerating means for cooling the walls of the cylinder, a door for closing said one end of the cylinder, and means for securing said door in a cylinder closing position, the cylinder having a dry powder ingredient inlet passage communicating with the cylinder at a location spaced from said one end, said door having a mix dispensing outlet communicating with the lower portion of the cylinder and a dispensing valve for controlling flow through the dispensing outlet, said door having a water inlet communicating with the upper portion of the cylinder and funnel means at the outside of the door and extending upwardly to a level above the cylinder, said door being formed of a transparent plastic material and having liquid level graduations thereon correlated with the volume at different levels in the cylinder, water supply means including a selectively operable water control valve mounted on the machine above the door and having a water delivery outlet at a location to deliver water to said funnel means on the door when the water control valve is opened, said means for securing the said door in a cylinder closing position including a retainer bar dimensioned to span the door and having means for securing the ends to the machine at opposite sides of the door, the retainer bar having first and second generally horizontal bar end portions interconnected adjacent the center of the door and vertically offset from each other a distance greater than the vertical height of the end portions so that when the liquid level is obscured at one side of the door by one bar end portion, the liquid level can still be viewed at the other side of the door.

2. A machine for mixing and cooling batches of dry powder ingredients and water according to claim 1 wherein said door has first and second downwardly opening hooks at the outer side thereof engageable with said first and second bar end sections for detachably supporting the door on the bar.

* * * * *